(12) United States Patent
Nonay

(10) Patent No.: US 6,318,298 B1
(45) Date of Patent: Nov. 20, 2001

(54) AUTOMATIC, ON-DEMAND, SELF-ADJUSTING BRUSHING SYSTEM FOR USE WITH LARGE ANIMALS, SUCH AS COWS

(76) Inventor: Dan Nonay, R.R. #1, Legal Alberta (CA), T0G 1L0

( * ) Notice: Subject to any disclaimer, the term of this patent is extended or adjusted under 35 U.S.C. 154(b) by 0 days.

(21) Appl. No.: 09/565,460

(22) Filed: May 5, 2000

(51) Int. Cl.[7] ............................. A01K 13/00; A46B 13/00
(52) U.S. Cl. ........................ 119/609; 119/600; 119/602; 119/612; 119/14.18; 15/53.2; 15/21.1
(58) Field of Search ........................... 119/600, 602, 119/609, 612, 14.01, 14.03, 14.18; 15/53.2, 21.1

(56) References Cited

U.S. PATENT DOCUMENTS

| | | | |
|---|---|---|---|
| 3,939,517 | * | 2/1976 | Bivens ................................... 15/53 A |
| 4,543,678 | * | 10/1985 | Cox ......................................... 15/56 |
| 5,715,558 | * | 2/1998 | Johnson ................................ 15/53.3 |
| 5,878,692 | * | 3/1999 | Örnerfors ........................... 119/14.08 |
| 5,970,911 | * | 10/1999 | van der Lely ..................... 119/14.03 |
| 5,979,002 | * | 11/1999 | Anderson .............................. 15/53.2 |

FOREIGN PATENT DOCUMENTS

9100180-A * 9/1992 (NL) ............................. A01K/13/00

* cited by examiner

*Primary Examiner*—Charles T. Jordan
*Assistant Examiner*—Kimberly S. Smith
(74) *Attorney, Agent, or Firm*—Terry M Gernstein

(57) ABSTRACT

A large animal, such as a cow, is brushed by a system that includes a brush mounted on a frame that is pivotally mounted on a structure such as a stall adjacent to the animal. A motor is connected to the brush to rotate the brush and is activated when the animal presses against the brush. A timer mechanism automatically de-activates the motor after a pre-set interval so another, separate, force must be applied to the brush to re-start the cycle. The brush is moved by the animal pressing against the brush to automatically accommodate different animal sizes.

11 Claims, 4 Drawing Sheets

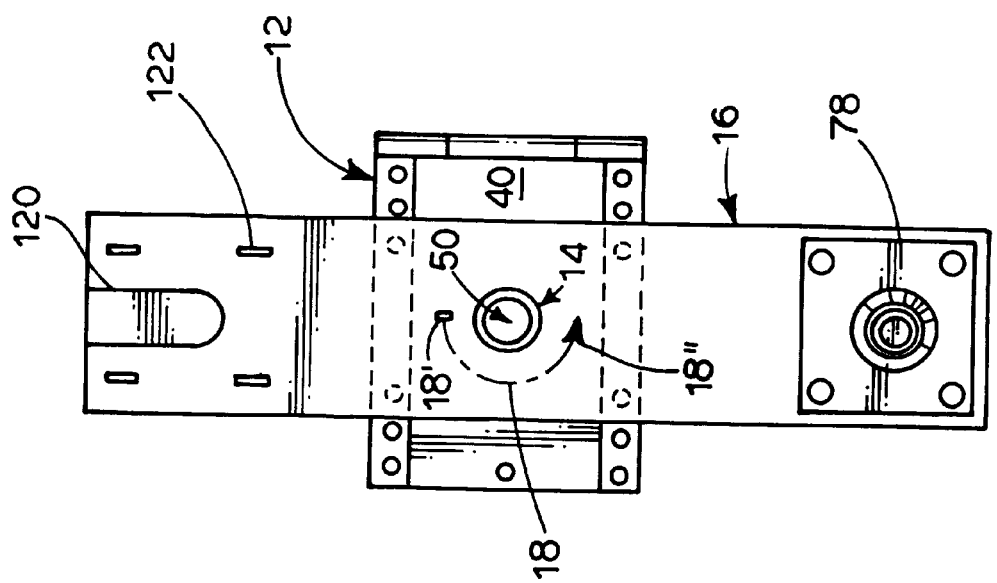
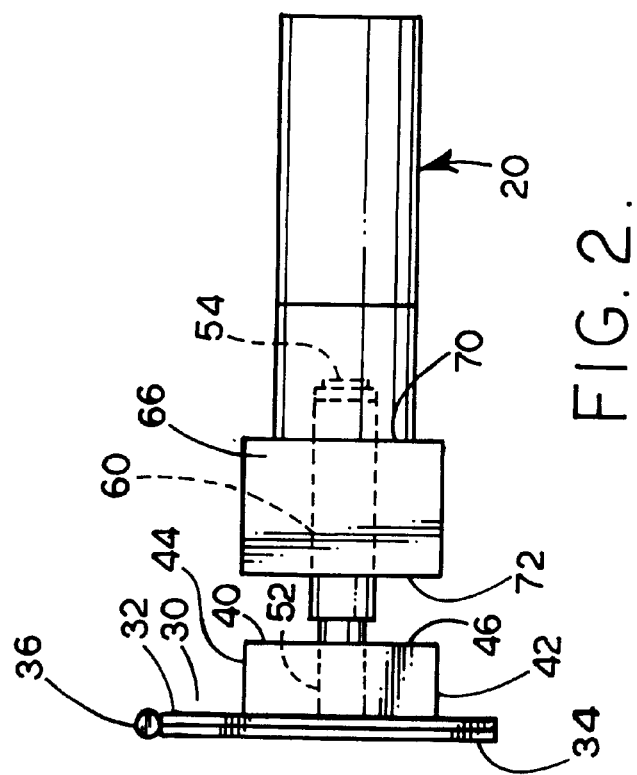

AUTOMATIC, ON-DEMAND, SELF-ADJUSTING BRUSHING SYSTEM FOR USE WITH LARGE ANIMALS, SUCH AS COWS

TECHNICAL FIELD OF THE INVENTION

The present invention relates to the general art of cleaning implements, and to the particular field of brushes, and most specifically, brushes used to clean animals.

BACKGROUND OF THE INVENTION

Many animals must be periodically brushed to remove shed hair, dander, insects and the like. Brushing also has beneficial effects for the health of the animal's skin and coat. It can be undesirable for the animal if the animal is not brushed. In some instances, brushing can be accompanied by the application of special medicinal powders and the like.

Accordingly, there are many designs for brushes intended to care for animals such as small pets, including dogs, cats and the like. Such brushes are generally hand held and are used by a human to groom the animal.

While these brushes work well for such small animals, large animals, such as cows, require brushing as well. The small hand-held brushes of the prior art may work to some degree, but are not fully practical for such large animals, especially if there are a large number of such large animals to be cared for. This problem is exacerbated if the animals are kept in stalls for long periods and may not be easily accessible for such grooming.

Accordingly, there is a need for a brushing device that can be used on large animals, such as cows. There is a further need for such a brushing device that can be used on an animal that is not confined and to which access may be difficult.

It is desirable that an animal be able to obtain brushing without depending on human contact. That is, the brushing should be available on a demand basis. This is especially true in the case of an animal that is not confined. Therefore, there is a need for an animal brushing system that can be automatically activated by an animal.

Still further, since not all animals are the same size, if a brush is automatically activated, it must also account for different size animals. If a human were operating the brush, such account would not be necessary; however, an automatically operated brush must be able to automatically accommodate different size animals.

Therefore, there is a need for an animal brushing system that does not need a human operator yet can accommodate different size animals.

Since many animals spend at least some of their time out of doors, it is desirable that a brushing system be amenable to outdoor as well as indoor use. Therefore, there is a need for an animal brushing system that can be used both indoors and outdoors.

Since many farms have a large number of animals, it is desirable that as many brushing systems as possible be available. However, these systems must be properly maintained. Maintenance cannot be overly expensive or time consuming or the purpose of the automatic, on-demand brushing system will be vitiated. Therefore, there is a need for an automatic, on-demand, self-adjusting brushing system that is easily maintained.

OBJECTS OF THE INVENTION

It is a main object of the present invention to provide an animal brushing system that can be used on large animals.

It is another object of the present invention to provide an animal brushing system that is automatically operated.

It is another object of the present invention to provide an animal brushing system that can be activated by the animal itself.

It is another object of the present invention to provide an animal brushing system that can accommodate animals of various sizes.

It is another object of the present invention to provide an animal brushing system that can automatically accommodate varying sizes in animals.

It is another object of the present invention to provide an animal brushing system that can be used outside and inside.

It is another object of the present invention to provide an animal brushing system that is easy to maintain.

It is a specific object of the present invention to provide an automatic, on-demand self-adjusting animal brushing system.

It is a specific object of the present invention to provide an automatic, on-demand self-adjusting animal brushing system that can be used on large animals.

It is a specific object of the present invention to provide an automatic, on-demand self-adjusting animal brushing system that can be used on large animals such as cows.

SUMMARY OF THE INVENTION

These, and other, objects are achieved by a motor operated animal brushing system that is pivotally mountable on a wall of a stall adjacent to an animal, and which has a switch that is operated when an animal pushes against the brush element of the system and a timer that automatically turns the motor off after a pre-set time interval.

In this manner, the brush can move to accommodate various size animals and will be located in a position that is most advantageous for brushing the animal. The animal can have its coat brushed at any time by simply pushing against the brush which will be automatically activated and then automatically de-activated after a pre-set time interval. Animals will quickly learn how to receive a brushing.

The brushing system includes a simple motor connected to a brush by a link, such as a chain, with a simple switch on the motor that is operatively connected to the brush so when the brush is forced upwardly as by contact with the back of an animal pushing against the brush, and a simple timer system that is connected to the motor to de-activate the motor after a pre-set time interval. The entire system is easily mounted on any convenient element, such as a stall, and is rugged and weather-proof so it can be used outdoors as well as indoors and yet requires minimum maintenance. The pivoting connection of the brush to a frame permits the brush to automatically move so an animal can move the brush by simply pressing against the brush element.

In this manner, an animal, such as a cow, can have dirt, excess hair, and the like removed from its body, and especially from its head, tail, back and neck, whenever it desires.

The brushing system of the present invention is versatile, low maintenance, and convenient. The best mode of the system is used in connection with large animals such as cows, but those skilled in the art will be able to apply the teaching of this disclosure to other animals and situations without departing from the scope of this disclosure. Accordingly, while the brushing system is disclosed in connection with cows and cow stalls, it is understood that such disclosure is not intended to be limiting.

BRIEF DESCRIPTION OF THE DRAWING FIGURES

Other objects, features and advantages of the invention will become apparent from a consideration of the following detailed description and the accompanying drawings.

FIG. 2 is a view of the system of the present invention taken along line 2—2 of FIG. 1.

FIG. 3 is a side elevational view of the system of the present invention.

DETAILED DESCRIPTION OF THE PREFERRED EMBODIMENT OF THE INVENTION

Figure 1:
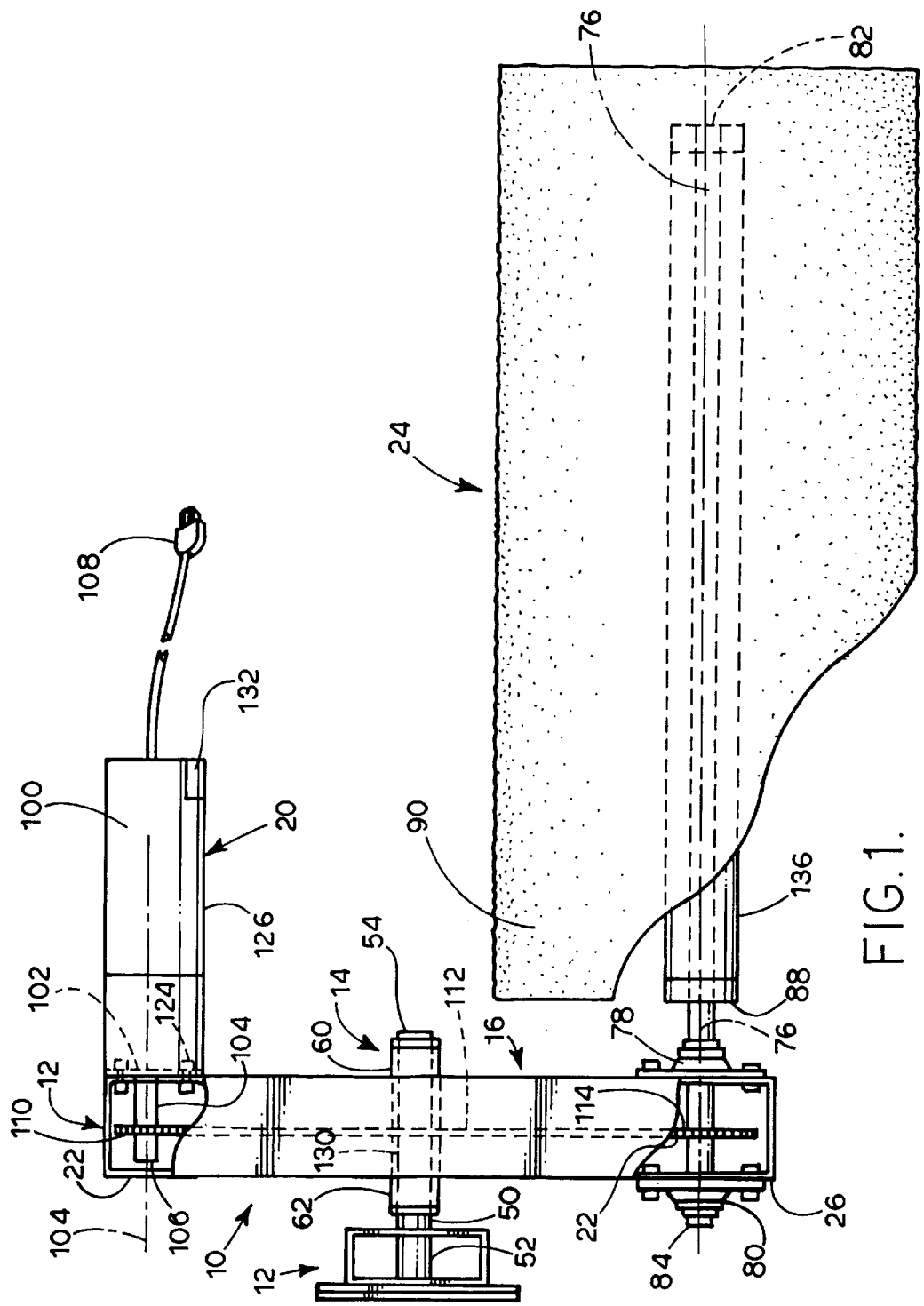
FIG. 1 is a top plan view of the automatic, on-demand self-adjusting animal brushing system embodying the present invention.

Referring to FIG. 1, an automatic, on-demand self-adjusting animal brushing system 10 is adapted to mount on a mounting element such as a wall of a stall adjacent to an animal in a manner which permits the animal to activate the brush to clean the animal's coat.

System 10 includes a mounting flange unit 12 which is attached to the stall or any other convenient structure to mount the system adjacent to the animal. A pivot element 14 is attached to flange unit 12 to extend away from the mounting structure, and a frame 16 is attached to pivot element 14 to move either clockwise or counter-clockwise about pivot element 14 as indicated by double-headed arrow 18 in FIG. 3. A driving motor 20 is mounted on frame 16 near one end 22 of the frame and a brush unit 24 is mounted on frame 16 near another end 26 of the frame.

As shown in FIGS. 1, 2 and 3, mounting flange unit 12 includes a hinged housing 30 having two plates 32 and 34 connected together by a hinge 36 so one plate will be located on one side of a stall wall portion and the other plate will be located on the other side of the wall portion with hinge 36 located on top of the wall portion whereby housing 30 rests on top of the wall portion. A housing element 40 is located on plate 32 to overlie the wall portion when unit 12 is in place on the wall portion. Element 40 includes two side walls 42 and 44 and a front wall 46 which is spaced from plate 32 for a purpose that will be understood from the disclosure herein.

As shown in FIGS. 1, 2 and 3, pivot element 14 includes a pivot shaft 50 having a proximal end 52 rotatably received in front wall 46 and extending outwardly from front wall 46 to a distal end 54 spaced apart from front wall 46. A sleeve 60 surrounds pivot shaft 50 between the ends of that shaft.

Frame 16 is attached to sleeve 60 to be pivotally attached to the wall portion via flange unit 12. Frame 16 is attached to sleeve 60, and sleeve 60 is rotatably attached to pivot shaft 50. A biasing element, such as torsion spring 62, connects sleeve 60 to pivot shaft 50 so rotational movement of frame 16 with respect to flange unit 12 is resisted by the biasing element. For example, clockwise rotation of frame element 16 about pivot shaft 50 as indicated in FIG. 3 by arrow head 18' is resisted by biasing element 62 which biases frame 16 in the counter-clockwise direction indicated by arrow head 18'', and vice versa. The purpose of the just-described biasing will be understood from the following disclosure.

Frame 16 is channel-shaped to define a hollow interior space 66 which extends from end 22 to end 26 of the frame. Frame 16 includes a top wall 68 and two side walls 70 and 72 which are mounted on sleeve 60 for movement therewith.

Brush unit 24 is mounted on frame 16 near end 26 and includes a driven rod 76 rotatably mounted on frame 16 by bearing units 78 and 80 and which extends from inside frame 16 outwardly therefrom to distal end 82 which is spaced apart from frame 16, A proximal end 84 of driven rod 76 is located on one side of frame 16 while distal end 82 is located on another side of frame 16.

Bearing elements 78 and 80 support driven rod in place on frame 16 and include ball bearings and the like common to such bearing elements to support driven rod 76 on frame 16 in a manner which permits driven rod 76 to rotate clockwise and/or counter-clockwise about its longitudinal axis $76_L$.

Driven rod 76 has a sleeve 88 fixed thereto for rotation therewith. Sleeve 88 can be releasably mounted on driven rod 76 if desired. A bristle unit 90 is fixed to sleeve 88 for rotation therewith so a rotary brushing action is defined by bristle unit 90 when driven rod 76 is rotatably driven.

Figure 4:
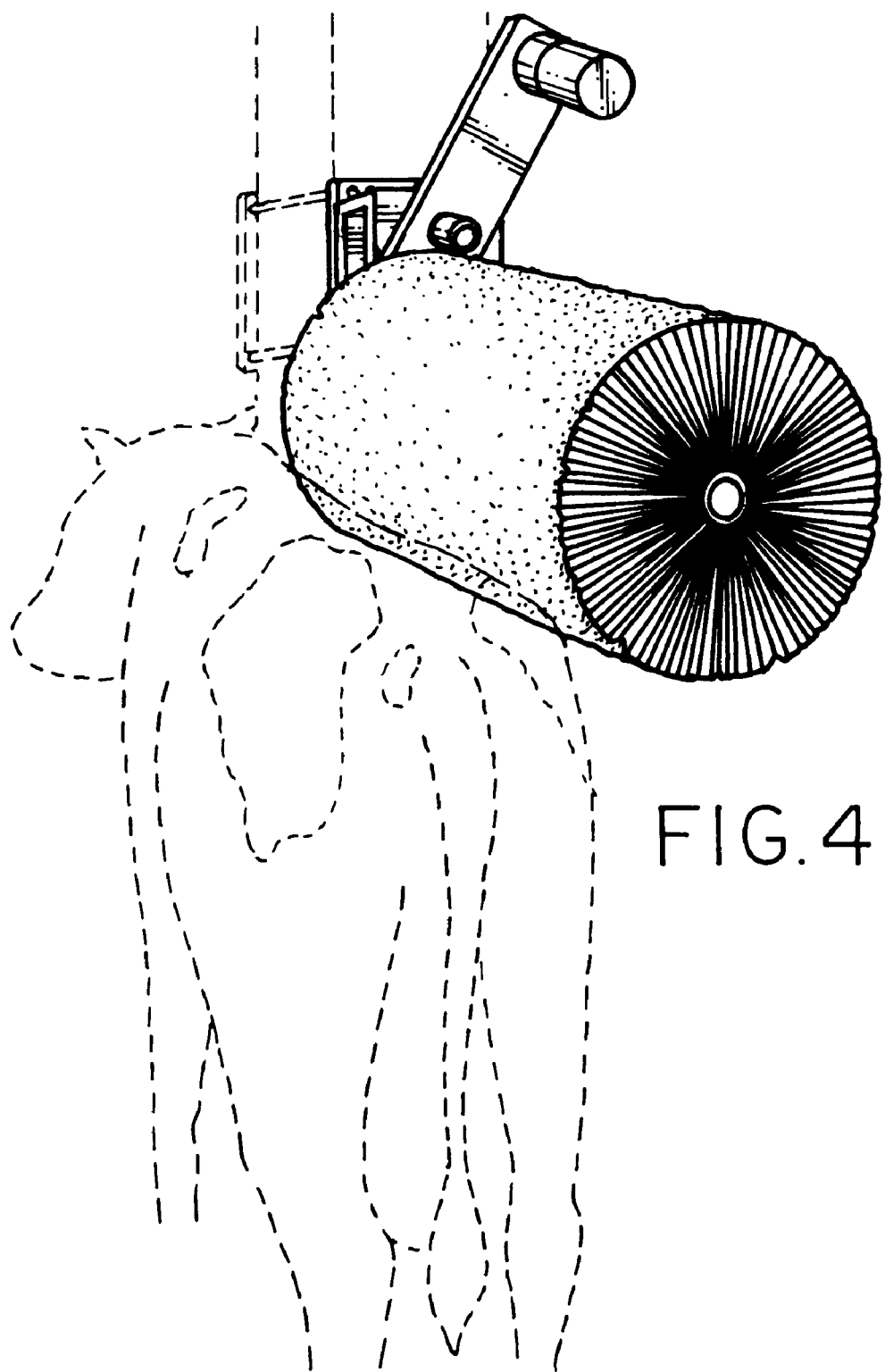
FIG. 4 is one view of the animal brushing system engaging a cow.
Figure 5:
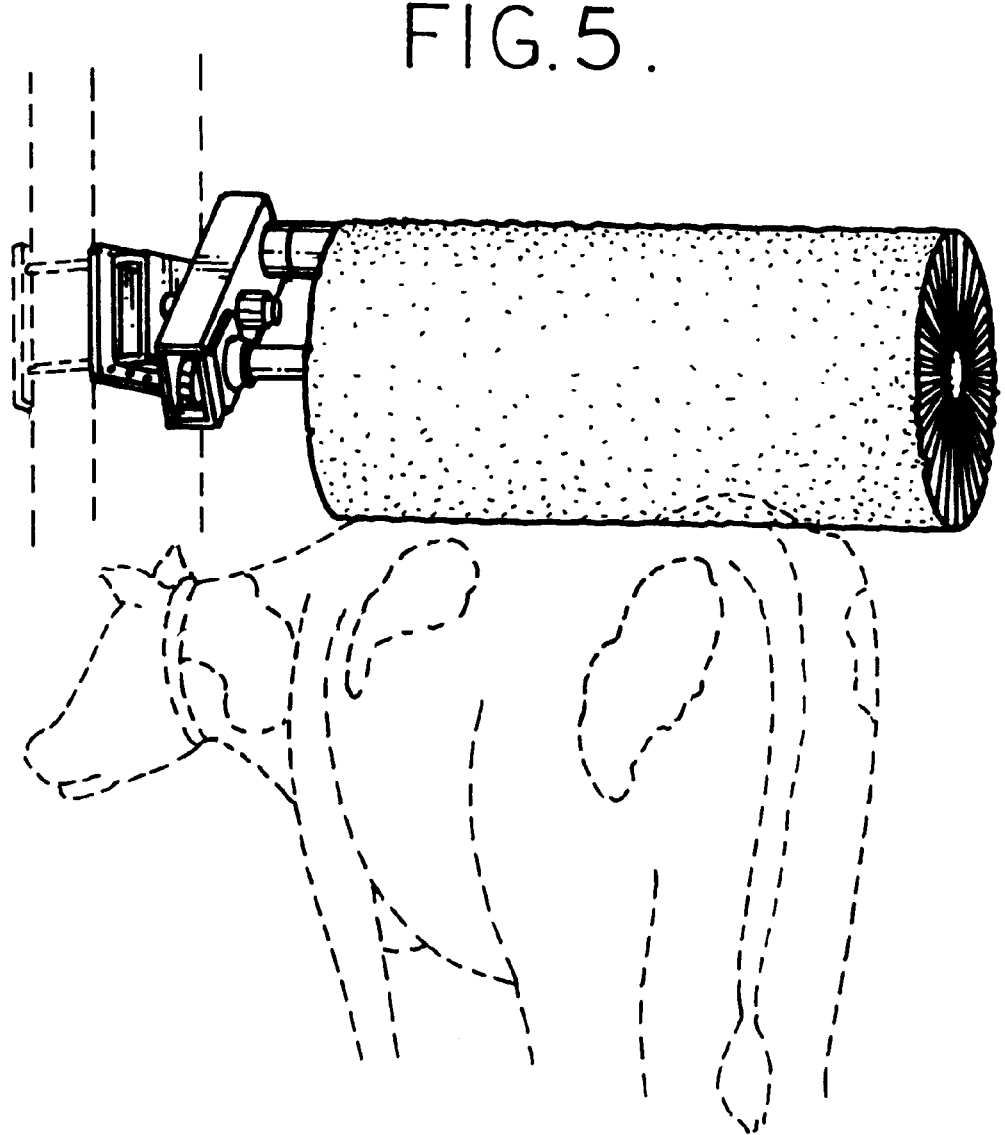
FIG. 5 is another view of the animal brushing system engaging a cow.

As will be understood from the teaching of this disclosure, bristle unit 90 is sized and the material of the bristles of the unit is selected to accommodate large animals, such as cows, such as shown in FIGS. 4 and 5.

As shown in FIG. 1, driven motor 20 is mounted on frame 16 near end 22 thereof. Driven motor 20 includes a motor, such as electric motor 100 mounted on frame 16 by a motor mount 102. A driving rod 104 is driven by motor 100 and extends into interior 66 of frame 16 to a distal end 106. Motor 100 is powered from a usual source via a plug such as plug 108 or the like and drives rod 104 rotatably about the longitudinal centerline $104_L$. However, if desired, battery power can be used without departing from the scope of this disclosure.

A driving sprocket 110 is fixedly mounted on driving rod 104 for rotation therewith and is drivingly connected to a connecting element, such as a chain 112, that extends longitudinally inside frame 16 between ends 22 and 26 thereof. Chain 112 is drivingly connected to a driven sprocket 114 mounted on driven rod 76 to rotatably drive rod 76 about its longitudinal centerline $76_L$ when rotational motion is imparted to driving sprocket 110 by motor 100. In this manner, bristles 90 will be rotatably driven by motor 100 when motor 100 is operating. Chain 112 is oriented in a circular pattern to enclose pivot pin 50.

As best shown in FIGS. 1 and 3, frame 16 includes a slot 120 through which driving rod 104 extends and a plurality of elongated slots, such as slot 122 which receive bolts, such as bolt 124, that attach motor housing 126 to frame 16. The elongated shape of slots 122 permit the motor to be moved longitudinally of frame 16 to apply and maintain the desired tension to chain 112.

An auto-start feature is included in unit 10 whereby an animal can start rotation of bristle unit 90 by simply pressing against that bristle unit. The auto-start feature includes a pressure sensitive switch 130 connected to sleeve 62 and electrically connected to motor 100 to start that motor whenever pressure is applied to switch 130. A simple push switch can be used as switch 130, or a switch controlled by torsion spring 62 can be used. Those skilled in the art will understand what type of switch can be used to start motor 100 when pressure is applied to bristle unit 90. A timer mechanism 132 is electrically connected to motor 100 and switch 130 to automatically turn off motor 100 at a preset time interval after motor 100 is activated. Timer mechanism 132 can be any type of mechanism well known to those skilled in the art. In the alternative, the motor can be controlled to simply operate intermittently, that is, automatically operate for a pre-set period, then de-activate and then automatically operate again for another pre-set period, and so forth.

Pesticide can be dispensed via holes, such as hole 136, defined in sleeve 88 if desired. This will permit treatment of the animal during grooming.

Operation of the brushing system can be understood from the foregoing. As an animal pushes against bristle unit 90, frame 16 pivots about pivot shaft 50 to adjust the position of bristle unit 90 on the animal against the bias of spring 62 whereby animals of different sizes and heights can be automatically accommodated by system 10 (compare FIGS. 4 and 5). Pushing against bristle unit 90 causes corresponding pressure to be applied to switch 130 via frame 16, which completes a power circuit to motor 100 and timer mechanism 132. This activates both the motor and the timer mechanism whereby rotation is imparted to driving rod 104, which is transferred to driven rod 76 via chain 112 and sprockets 110 and 114. Rotation of rod 76 rotates bristle unit 90 to brush the animal, and to dispense pesticide from sleeve 88 via holes 136. After a pre-set interval, timer mechanism 132 automatically de-activates motor 100 and resets itself so another, separate and independent application of pressure on bristle unit 90 is required to re-start motor 100 and re-start the just-described cycle of operation. The de-activation of motor 100 by timer mechanism 132 occurs regardless of whether or not pressure on bristle unit 90 has been released during the timed period.

It is understood that while certain forms of the present invention have been illustrated and described herein, it is not to be limited to the specific forms or arrangements of parts described and shown.

What is claimed is:

1. An automatic, on-demand, self-adjusting brushing system for use with animals comprising:

A) a mounting flange unit which includes an adjustable mounting bracket and a size adjusting element to capture a mounting element in said mounting flange unit to mount said mounting flange unit thereon;

B) a pivot element connected to said mounting flange unit;

C) a frame connected to said pivot element for pivotal movement about said pivot element;

D) a driving motor mounted on said frame near one end of said frame and including a driving rod extending into said frame and which is connected to said driving motor to be rotatably driven by said motor;

E) a brush unit mounted on said frame near another end of said frame and including a rotatable shaft having a driven element extending into said frame, said brush unit including a brush sleeve having bristles thereon connected to said rotatable shaft for rotation therewith; and F) a connecting element connecting said driving rod to the driven element of said brush unit and transferring rotation of said driving rod to said driven rod via said connecting element.

2. The brushing system defined in claim 1 wherein said pivot element includes a torsion spring biasing said frame in one of a clockwise and a counter-clockwise direction about said pivot element.

3. The brushing system defined in claim 2 wherein said frame includes a channel member defining a hollow interior extending lengthwise along said frame.

4. The brushing system defined in claim 3 wherein said connecting element includes a chain located in the interior of said frame and connecting said driving rod to said driven element.

5. The brushing system defined in claim 4 wherein said driving motor includes a timer mechanism.

6. The brushing system defined in claim 6 wherein said brush unit includes a switch operatively connected to said driving motor to activate said driving motor when pressure is to said brush element.

7. The brushing system defined in claim 6 wherein said brush element includes pesticide dispensing elements.

8. The brushing system defined in claim 7 further including a motor mounting element on said frame.

9. The brushing system defined in claim 7 wherein said frame includes elongated slots defined in said frame and bolts extending through said slots.

10. The brushing system defined in claim 1 wherein said mounting flange unit includes two plates and a hinge connecting said two plates together.

11. The brushing system defined in claim 10 wherein said mounting flange unit further includes a housing mounted on one plate.

\* \* \* \* \*